United States Patent
Pe (10) Patent No.: US 9,150,284 B2
(45) Date of Patent: Oct. 6, 2015

(54) GRABBING APPARATUS

(71) Applicant: Einar Villarosa Pe, Cape Coral, FL (US)

(72) Inventor: Einar Villarosa Pe, Cape Coral, FL (US)

(*) Notice: Subject to any disclaimer, the term of this patent is extended or adjusted under 35 U.S.C. 154(b) by 0 days.

(21) Appl. No.: 14/472,506

(22) Filed: Aug. 29, 2014

(65) Prior Publication Data

US 2015/0183115 A1    Jul. 2, 2015

Related U.S. Application Data

(60) Provisional application No. 61/884,640, filed on Sep. 30, 2013.

(51) Int. Cl.
*B25J 1/04* (2006.01)
*B63B 21/00* (2006.01)

(52) U.S. Cl.
CPC ... *B63B 21/00* (2013.01); *B25J 1/04* (2013.01)

(58) Field of Classification Search
CPC ......... B25J 1/04; B25J 15/0028; B63B 21/54; B63B 21/00; A47F 13/06
USPC ................... 294/191, 19.3, 209, 210, 211, 22
See application file for complete search history.

(56) References Cited

U.S. PATENT DOCUMENTS

| | | | | |
|---|---|---|---|---|
| 1,277,778 A | * | 9/1918 | Tichacek | 294/22 |
| 1,452,679 A | * | 4/1923 | Fisher | 294/19.2 |
| 1,961,421 A | * | 6/1934 | Hogenson | 294/115 |
| 3,945,335 A | * | 3/1976 | Kratz | 114/221 R |
| 3,978,605 A | * | 9/1976 | Maruniak | 43/5 |
| 4,160,563 A | * | 7/1979 | Whitney | 294/104 |
| 5,048,221 A | * | 9/1991 | Kunkel | 43/6 |
| 5,941,586 A | * | 8/1999 | Fann | 294/104 |
| 2012/0038179 A1 | * | 2/2012 | Segovia | 294/19.3 |

* cited by examiner

*Primary Examiner* — Dean Kramer
(74) *Attorney, Agent, or Firm* — George F. Wallace (57) ABSTRACT

A grabbing apparatus comprises a first arm, a first proximal end, a first distal end, a first anchor arm affixed at the first distal end, a second arm, second proximal end, a second distal end, and a second anchor arm affixed at the second distal end. The second anchor arm is affixed to the first anchor arm, and a flexible attachment member is deformably affixed to the first anchor arm and the second anchor arm. The first arm and second arm are affixed to the base at an affixation point. When a force vector is applied to at least one of the first arm and the second arm, the flexible attachment member deforms, moving the first arm and the second arm towards one another and engages the lock, to connect the grabbing apparatus to a docking location.

5 Claims, 5 Drawing Sheets

GRABBING APPARATUS

CROSS-REFERENCE TO RELATED APPLICATION

This application claims reference to a previously filed Provisional Patent Application 61/884,640 filed Sep. 30, 2013, which is incorporated by reference herein.

FIELD OF THE INVENTION

The present invention relates to grabbing apparatuses.

BACKGROUND OF THE INVENTION

Grabbing apparatuses act to assist a person or machine to attach to or latch on to an object not within reach. Grabbing apparatuses may be used in a number of fields and vary in shape and size. A typical apparatus can include a handle, an opening, and elements for manually closing the opening near the object.

SUMMARY OF THE INVENTION

It is, therefore, an object of the present invention to provide a grabbing apparatus. It is another object of the present invention to provide a method of using said grabbing apparatus. A method to service such grabbing apparatus is also contemplated.

An exemplary environment for the present invention can include, but is not limited to, a marine docking environment, for example, latching on to a dock piling, an aeronautical docking environment, for example, glomming into a hanger space, and any other docking environment in which attaching to or grasping a movable or stationary object is desired.

In an exemplary embodiment of the present invention, a grabbing apparatus can include a first arm, a second arm, a flexible attachment member, and a base.

In an exemplary aspect of the present invention, the first arm can have a first proximal end and a first distal end. The first arm can further comprise a first anchor arm affixed at the first distal end, via a first fastener.

In another exemplary aspect, the second arm can also have a proximal end and a distal end. The second arm can also comprise a second anchor arm affixed at the second distal end, via a second fastener. In addition, the second anchor arm can be affixed to the first anchor arm, via a third fastener.

In yet another exemplary aspect of the present invention, the flexible attachment member can be affixed to the first anchor arm and affixed to the second anchor arm, via at least one of a deformable fastener.

In a further exemplary aspect, the base can comprise a releasable lock.

In an additional exemplary aspect, the base can further comprise an at least one point of affixation for the first arm and the second arm. In this exemplary aspect, the first arm can be affixed to the base at the first proximal end and the second arm can be affixed to the base at the second proximal end via at least one of a fourth fastener.

In a further exemplary aspect, where a force vector is applied to at least one of the first arm and the second arm, the flexible attachment member deforms, moving the first arm and the second arm directionally towards one another and engages the releasable lock, to removably connect the grabbing apparatus around a docking location.

An exemplary material for any portion of the present invention can include, but is not limited to, one or more of the following: metal, steel, stainless steel, aluminum, a metallic amalgam, non-ferrous metals, phosphor bronze, titanium, beryllium copper, plastic, oil tempered chrome silicon, a plastic composite, fiberglass, wood and any other material that can withstand loading, torsion and other forms of deformation but also maintain high tensile strength and remain light in weight.

The following are additional and/or exemplary aspects of the present invention, one or more of which can be combined with the basic invention as embodied above:

The first arm and the second arm can be rotatably affixed to the base at the at least one point of affixation;

the first arm and the second arm can be statically affixed to the base at the at least one point of affixation;

the first arm can be rotatably affixed to the base at a second point of affixation and the second arm can be rotatably affixed to the base at a third point of affixation, wherein the second proximal point of affixation and the third proximal point of affixation are not the same point of affixation;

at least a portion of the first arm can be arced at the distal end;

at least a portion of the second arm can be arced at the distal end;

at least a portion of the first arm and the second arm mirror one another;

at least a portion of the first arm can be straight at the distal end;

at least a portion of the second arm can be straight at the distal end;

at least a portion of the first arm and the second arm are opposingly shaped;

at least a portion of the first arm can have a flat shape;

at least a portion of the second arm can have flat shape;

at least a portion of the first arm can have a dimensional shape, for example, cylindrical, conical or any other dimensional shape;

at least a portion of the second arm can have a dimensional shape, for example, cylindrical, conical or any other dimensional shape;

at least a portion of the first arm can have a smooth finish;

at least a portion of the second arm can have a smooth finish;

at least a portion of the first arm can have a rough finish;

at least a portion of the second arm can have a rough finish;

the first arm can have a top wing and a bottom wing, so that the second arm can be placed between the top wing and the bottom wing;

at least a portion of the first support can have a dimensional shape, for example, cylindrical, conical or any other dimensional shape;

at least a portion of the second support can have a dimensional shape, for example, cylindrical, conical or any other dimensional shape;

the base can further comprise an activating mechanism, wherein the activating the mechanism applies a force vector to at least one of the first arm and the second arm, deforming the flexible attachment member and moving the first arm and the second directionally towards one another;

the base can further comprise a removable section, wherein the base releases the removable section from the grabbing apparatus when at least one of the first arm and the second arm are set into an immobile position;

the base can further comprise a cordage element, wherein when at least one of the first arm and the second arm are set into an immobile position, the cordage element unravels from the base;

the base can further comprise at least a second flexible attachment member, wherein the at least second flexible attachment member affixes the first arm to the base;

the base can further comprise at least a third flexible attachment member, wherein the at least third flexible attachment member affixes the second arm to the base;

the releasable lock can further comprise a second releasable lock which stops the movement of at least one of the first arm and the second arm;

the flexible attachment member can be a conical compression spring;

the flexible attachment member can be a torsion spring; and the flexible attachment member can be an elastic material.

Additional exemplary embodiments include methods of using the grabbing apparatus with any embodiment of a grabbing apparatus described herein; and a method of servicing any embodiment of a grabbing apparatus described herein, where at least one of a first arm, a first anchor arm, a second arm, a second anchor arm, a base, a flexible attachment member, an activating mechanism, a second releasable lock, a removable section, a cordage element, a second flexible attachment member, any of the fasteners and attachment elements or any element used herein to affix any of the same are serviced. Servicing can include, but is not limited to, general maintenance, repair, modification and/or replacement in whole or in part.

These and other exemplary aspects of the present invention are described herein.

Those skilled in the art will recognize still other aspects of the present invention upon reading and understanding the attached description.

BRIEF DESCRIPTION OF THE DRAWINGS

The present invention is illustrated by way of example, and not in limitation, in the figures of the accompanying drawings.

DETAILED DESCRIPTION OF THE INVENTION

The present invention will now be described in more detail by way of example with reference to the embodiments shown in the accompanying figures. It should be kept in mind that the following described embodiments are only presented by way of example and should not be construed as limiting the inventive concept to any particular physical configuration, material or order.

Attaching to or latching on to objects is a common need in many industries. In one example, a human being often needs to attach to or grasp stationary or movable objects when the human being is positioned on a movable object, such as a boat, motor vehicle, or aeronautical craft. Examples include, but are not limited to, docking a marine vessel, piloting an aircraft, and driving an automobile. Non-human entities can also have a need to attach to or latch on to stationary or movable objects. For example, large robotic machinery often needs to attach to or grasp stationary or movable objects, such as in one instance, docking a tanker vessel without the use of side thrusters or anchoring an unmanned, radio-controlled aircraft.

Embodiments of the present invention, as illustratively shown in the figures, define a grabbing apparatus to minimize risk of and assist with attaching to or latching on to stationary or movable objects.

Figure 1:
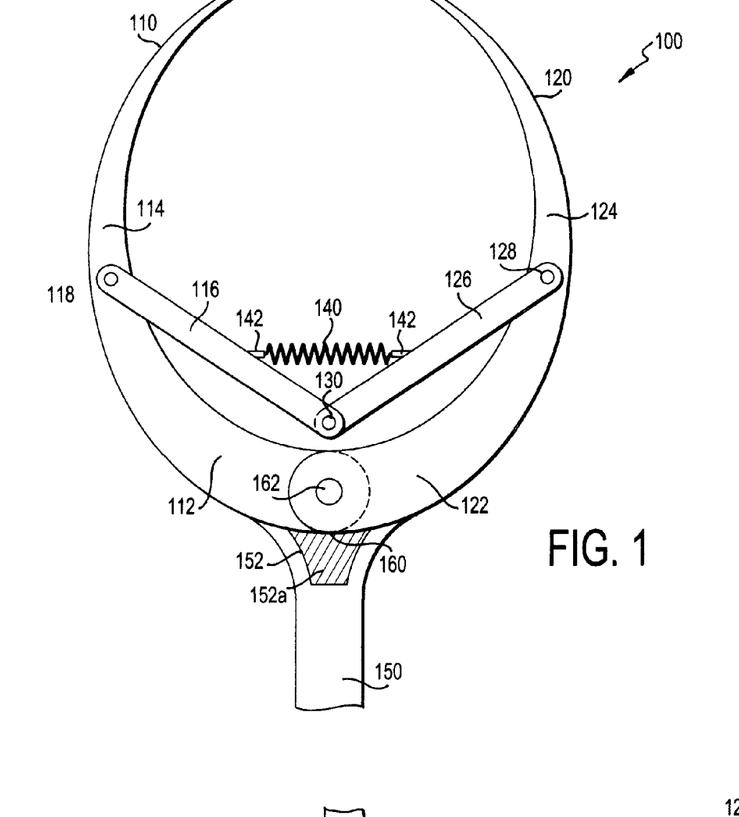
FIG. 1 illustrates an exemplary embodiment of the present invention, in which a grabbing apparatus includes a first arm, a second arm, a base, and a flexible attachment member.

FIG. 1 illustrates one exemplary embodiment of the present invention, in which a grabbing apparatus 100 includes a first arm 110, a second arm 120, a flexible attachment member 140, and a base 150.

As shown in FIG. 1, first arm 110 can have a first proximal end 112 and a first distal end 114. First arm 110 can be formed of a light-weight, high tensile strength material, including but not limited to, metal, steel, stainless steel, aluminum, a metallic amalgam, non-ferrous metals, phosphor bronze, titanium, beryllium copper, plastic, oil tempered chrome silicon, a plastic composite, fiberglass, wood and any other material that can withstand loading, torsion and other forms of deformation but also maintain high tensile strength and remain light in weigh, as well as be functionally compatible with the present invention as described and/or claimed.

First arm 110 is illustrated in FIG. 1 as having at least a portion that is arced shaped, with the first proximal end 112 and the first distal end 114 being oriented near the ends of the arced curvature. However, any other functionally compatible shape can be provided. For example, at least a portion of first arm 110 can alternatively or additionally have a linear shape, for example, resulting in a triangular shape. It is expressly set forth that all possible shapes of first arm 110 include at least a portion having an arc or linear shape, which can form any shape, including a spiral or helical shape.

As also shown in FIG. 1, first arm 110 further comprises a first anchor arm 116 affixed at the first distal end via a first fastener 118. First anchor arm 116 is illustrated in FIG. 1 as having at least a portion that is cylindrically shaped. However, any other functionally compatible shape can be provided. For example, at least a portion of first anchor arm can alternatively or additionally have a flat, linear shape, a conical shape or any other functionally compatible shape.

As illustrated in FIG. 1 first anchor member 116 can be formed of any of a light-weight, high tensile strength material, including but not limited to, metal, steel, stainless steel, aluminum, a metallic amalgam, non-ferrous metals, phosphor bronze, titanium, beryllium copper, plastic, oil tempered chrome silicon, a plastic composite, and any other material that can withstand loading, torsion and other forms of deformation but also maintain high tensile strength and remain light in weigh, as well as be functionally compatible with the present invention as described and/or claimed.

As illustrated in FIG. 1, first anchor arm 116 can be affixed to the distal end 114 of the first arm 110 via a first fastener 118.

First fastener 118 is illustratively shown in FIG. 1 as a rotatable screw; however any functionally compatible attachment element can be provided. For example, first fastener 118 can have one or more components that attach, or cooperatively attach to the first arm 110, such as one or more of a screw, a screw or bolt with an optional complementarily shaped washer and/or nut, a rivet, an enclosed ball bearing, any pivoting fastener or any other functionally compatible attachment element.

FIG. 1 additionally illustrates second arm 120 can have a second proximal end 122 and a second distal end 124. Second arm 120 can be formed of a light-weight, high tensile strength material, including but not limited to, metal, steel, stainless steel, aluminum, a metallic amalgam, non-ferrous metals, phosphor bronze, titanium, beryllium copper, plastic, oil tempered chrome silicon, a plastic composite, fiberglass, wood and any other material that can withstand loading, torsion and other forms of deformation but also maintain high tensile strength and remain light in weigh, as well as be functionally compatible with the present invention as described and/or claimed.

Second arm 120 is illustrated in FIG. 1 as having at least a portion that is arced shaped, with the second proximal end 122 and the second distal end 124 being oriented near the ends of the curvature. However, any other functionally compatible shape can be provided. For example, at least a portion of second arm 120 can alternatively or additionally have a linear shape, for example, resulting in a triangular shape. It is expressly set forth that all possible shapes of second arm 120 include at least a portion having an arc or linear shape, which can form any shape, including a spiral or helical shape.

As also illustrated in FIG. 1, second arm 120 has a shape which mirrors the shape of first arm 110. However, any other functionally compatible shape, as described above, can be provided for second arm 120, regardless of the shape of first arm 110. It is expressly set forth that all possible shapes of second arm 120 can be compatible with all possible shapes of first arm 110.

As illustrated in FIG. 1, second arm 120 further comprises a second anchor arm 126 affixed at the second distal end 124 via second fastener 128. Second anchor arm 126 is illustrated in FIG. 1 as having at least a portion that is cylindrically shaped. However, any other functionally compatible shape can be provided. For example, at least a portion of first anchor arm can alternatively or additionally have a flat, linear shape, a conical shape or any other functionally compatible shape.

As illustrated in FIG. 1 second anchor arm 126 can be formed of any of a light-weight, high tensile strength material, including but not limited to, metal, steel, stainless steel, aluminum, a metallic amalgam, non-ferrous metals, phosphor bronze, titanium, beryllium copper, plastic, oil tempered chrome silicon, a plastic composite, and any other material that can withstand loading, torsion and other forms of deformation but also maintain high tensile strength and remain light in weigh, as well as be functionally compatible with the present invention as described and/or claimed.

As illustrated in FIG. 1, second anchor arm 126 can be affixed to the distal end 124 of the second arm 120 via a second fastener 128. Second fastener 128 is illustratively shown in FIG. 1 as a rotatable screw; however any functionally compatible attachment element can be provided. For example, second fastener 128 can have one or more components that attach, or cooperatively attach to the second arm 120, such as one or more of a screw, a screw or bolt with an optional complementarily shaped washer and/or nut, a rivet, an enclosed ball bearing, any pivoting fastener or any other functionally compatible attachment element.

As also illustrated in FIG. 1, second anchor arm 126 is affixed to the first anchor arm 116 via a third fastener 130. Third fastener 130 is illustratively shown in FIG. 1 as a rotatable screw; however any functionally compatible attachment element can be provided. For example, third fastener 130 can have one or more components that attach, or cooperatively attach to the first anchor arm 116, such as one or more of a screw, a screw or bolt with an optional complementarily shaped washer and/or nut, a rivet, an enclosed ball bearing, any pivoting fastener or any other functionally compatible attachment element FIG. 1 depicts second anchor arm 126 having a shape which mirrors the shape of first anchor arm 116. However, any other functionally compatible shape, as described above, can be provided for second anchor arm 126, regardless of the shape of first anchor arm 120. It is expressly set forth that all possible shapes of second anchor arm 126 can be compatible with all possible shapes of first anchor arm 116.

FIG. 1 further illustrates grabbing apparatus 100 having a flexible attachment member 140 deformably affixed to the first anchor arm 116 and deformably affixed to the second anchor arm 126 via at least one deformable fastener 142. Deformation can be defined as the change in geometry of a material when stress is applied. Deformation may not be uniform and may not be aligned with any stress forces exerted on the material creating the deformation. Flexible attachment member 140 can be affixed in such a manner as to allow adequate deformation while maintaining high tensile strength and the ability to return to an adequate simulation of pre-deformation geometry. Deformation, tension and stress will be described in further detail below.

Figure 1A:
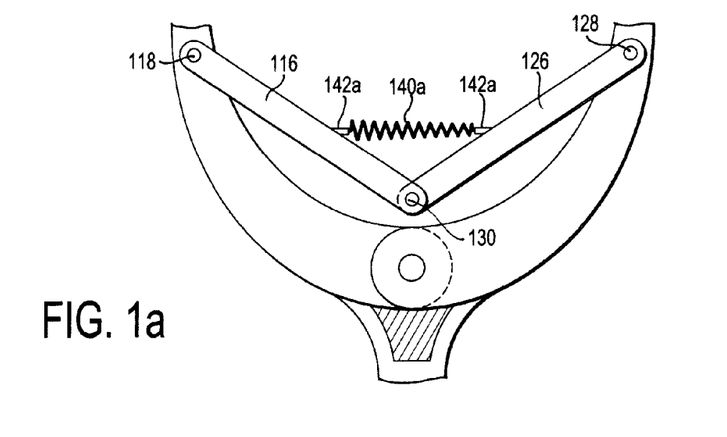
FIG. 1a illustrates a flexible attachment member as a conical compression spring.

FIG. 1 illustrates flexible attachment member 140 as a coil spring for tension, as coil springs conduct balanced inward forces, also known as pushing forces, with no net sum of torque directed so as to deform or reduce size in one or more directions. However, any type of flexible attachment member is contemplated. For example, a variety of different flexible materials may be contemplated, including but not limited to, constant springs which provide a supported load and remain the same throughout the a deformation cycle, variable springs which provides different resistance in the spring to load variances during deformation, wave springs which can be helix-shaped, torsion Spring which allow for deformation in an axial or twisting direction, as end of the spring rotates through an angle as stress is applied. As shown in FIG. 1a, flexible attachment member 140 can be a conical compression spring 140a.

Additional flexible materials contemplated may also include die springs round-wire springs, where heavy duty compression is contemplated, flat springs made of a flat or conical-shaped piece of metal, machined springs which can be made by machining bar stock with a lathe and/or milling operation rather than coiling wire, cantilever springs which are fixed only at one end, conical springs made by coiling wire around a cone so that the wire itself is twisted when the spring is compressed or stretched, volute springs which are designed so that under stress the coils are not forced against each other, thus permitting longer travel, hairspring or balance springs which can be delicate spiral torsion springs used in places where electricity must be carried to partially rotating devices such as steering wheels without hindering rotation, and leaf springs which are flat springs commonly used in vehicle suspensions, electrical switches and bows.

As illustrated in FIG. 1, flexible attachment member 140 can be formed of any of a light-weight, high tensile strength material, including but not limited to, metal, steel, stainless steel, aluminum, a metallic amalgam, non-ferrous metals, phosphor bronze, titanium, beryllium copper, plastic, oil tempered chrome silicon, a plastic composite, fiberglass, music wire, elgiloy and any other material that can withstand loading, torsion and other forms of deformation but also maintain high tensile strength and remain light in weigh, as well as be functionally compatible with the present invention as described and/or claimed. For example, flexible attachment member 140 can be a rubber band embedded with strengthening silicon, or any other deformable material which can return to a simulation of a pre-deformation shape.

Furthermore, all materials contemplated for use as the flexible attachment member is subject to Hooke's Law, which states that a force with which a flexible member pushes back to a pre-deformation geometry is linearly proportional to the distance from the equilibrium, or pre-deformation, geometry. All materials also have a spring constant value, also known as the change in the force the material exerts divided by the change in deflection of the material. All materials will react differently depending on the initial displacement of the material, the velocity of a stress applied and the overall mass comprising and/or attached to the material.

As also depicted in FIG. 1, flexible attachment member 140 can be affixed to the second anchor arm 126 and the first anchor arm 116 via at least one deformable fastener 142. Deformable fastener 142 is illustratively shown in FIG. 1 as a spring attaching apparatus; however any functionally compatible attachment element can be provided. For example, second fastener 128 can have one or more components that attach, or cooperatively attach to the second arm 120, such as one or more of a screw, a screw or bolt with an optional complementarily shaped washer and/or nut, a rivet, an enclosed ball bearing, any pivoting fastener or any other functionally compatible attachment element, including but not limited to, a glue-like substance, solder, or other attachment apparatus.

As further illustrated in FIG. 1, grabbing apparatus 100 also comprises a base 150. Base 150 acts as a handle and a structural component of the grabbing apparatus 100. Base 150 is illustrated in FIG. 1 as having at least a portion that is cylindrical shaped. However, any other functionally compatible shape can be provided. For example, at least a portion of base 150 can alternatively or additionally have a flat linear shape, a symmetrical linear or arced shape and an asymmetrical linear or arced shape. It is expressly set forth that all possible shapes of base 150 include at least a portion having an arc or linear shape, which can form any shape, including a cylinder, cone, bar or helical shape.

Base 150 further comprises a releasable lock 152, as illustrated in FIG. 1. Releasable lock 152 acts as a stopping mechanism of the first arm 110 and the second arm 120, so that grabbing apparatus 100 can be removably connected to a docking location. Releasable lock 152 is illustrated as a generic device in FIG. 1. A variety of locking mechanisms are contemplated, however, including but not limited to cam locks, chamber locks, combination locks, cylinder locks, waterproof and high pressure proof electronic locks, electric strike locks, magnetic locks, mortise locks, lever and/or tumbler locks, RFID-styled locks, positive locking devices using a fastener element that cannot work loose from vibrations, including but not limited to, a split beam nut and a split pin, a castellated nut and a split pin, a hex nut and/or cap screw with a tab washer, a hex nut and/or cap screw and a lock plat, safety wiring with a various types of fastening elements, and any other reasonably functional releasable locking element or combination of elements. Notably, releasable lock 152 can further comprise a second releasable lock 152a, which can stop the movement of at least one of the first arm and the second arm.

It should be noted that FIG. 1 depicts the releasable lock 152 as being attached and/or integrated into base 150. However, a variety of configurations of releasable lock 152 are contemplated, including but not limited to, a hand-held remote control which can be activated from a remote location, a radio or near frequency sensor which can be activated and/or pinged from a mobile device such as a phone, or any other functionally reasonable attached or detached releasable lock 152 which can be reasonably engaged to keep the first arm and the second arm in the desired closed position.

As additionally illustrated in FIG. 1, base 150 further comprises an at least one point of affixation 160 for the first arm 110 and the second arm 120. At this point of affixation 160, the first arm 110 is affixed to the base 150 at said first proximal end 112 and the second arm 120 is affixed to the base 150 at said second proximal end 122 via at least one of a fourth fastener 162.

It should be noted that the at least one point of affixation 160 is illustratively shown in FIG. 1 as being circular and passing through the proximal ends 112, 122 of the first arm 110 and the second arm 120, respectively, however any structurally compatible point of affixation 160 can be provided. For example, point of affixation 160 can be any geometric, symmetric, asymmetric, regular or oversized shape passing through the proximal ends 112, 122 that functionally corresponds with the dimensions of the first arm 110 and second arm 120.

Fourth fastener 162 is illustratively shown in FIG. 1 as a rotatable screw; however any functionally compatible attachment element can be provided. For example, fourth fastener 162 can have one or more components that attach, or cooperatively attach to the first arm 110 and the second arm 120, such as one or more of a screw, a screw or bolt with an optional complementarily shaped washer and/or nut, a rivet, an enclosed ball bearing, any pivoting fastener or any other functionally compatible attachment element.

Grabbing apparatus 100 engages action when a force vector is applied to at least one of the first arm 110 and the second arm 120. This action deforms the flexible attachment member 140, moving the first arm 110 and the second arm 120 directionally towards one another and engages the releasable lock 152, to removably connect the grabbing apparatus 100 to a docking location.

A force vector is any influence that causes an object to undergo a certain change, either concerning its movement, direction, or geometrical construction, such as deformation defined above. A force vector can cause an object with mass to change its velocity, which can include moving from a state of rest, or cause a flexible object to deform, which can include expanding or compressing, or both. A force vector can also be described by intuitive concepts such as a push or a pull. A force vector has both magnitude and direction, making it a vector quantity.

One type of deformation factor, or force vector, is the amount of load that can be applied to a material before it fails. The types of loading include, but are not limited to, a variety of loads. One type is transverse loading, which is defined as a force vector applied perpendicularly to the longitudinal axis of a material. Transverse loading causes the material to bend and deflect from its original position, and can also induce shear forces that cause deformation of the material whereby also increasing its own transverse deflection of the material.

Another type of loading is axial loading, defined as vector forces applied collinearly with the longitudinal axis of the material. Axial loading causes the material to stretch or shorten. An third type of loading is torsional loading, defined as a twisting action caused by at least a pair of externally applied equally and oppositely directed force couples acting on at least one parallel plane by a single external couple applied to a material that has one end fixed against rotation.

When a flexible object, for example, flexible attachment member 140 is subject to a force vector, every material will suffer some deformation, defined above, also known as stress and tension. The deformation may be or may not be uniform and may or may not be aligned along the directional axis of the force vector. Most materials will expand in directions where no force vector is being applied. The result of this expansion and/or stress may result in buckling, also known as a sudden failure of a structural member subjected to high stress where the actual stress at the point of failure is less than the ultimate stress that the material is capable of withstanding.

Strain, on the other hand, can be defined as a reduced deformation. Every material that suffers deformation will also suffer strain, or deformation per unit length of a given material. Deflection, like deformation, is defined as the magnitude to which a structural element bends under a force vector load.

Generally, three types of stress cause deformation. These include compressive stress, which is a stress state caused by an applied force vector that acts to reduce the length of the material in the axis of the applied load. This is also known as squeezing, a uniaxial compression induced by the action of opposite pushing forces. The compressive strength of most materials is higher than its tensile strength.

Tensile stress is defined as a stress state caused by an applied load that tends to elongate the material in the axis of the applied load, in other words, the stress cause by pulling. Materials loaded in tension are susceptible to stress contractions, such as material defects or abrupt changes in geometry. Ductile materials, for example, most metals, are able to statistically tolerate a minimum amount of defects, however, brittle materials, for example, ceramic and porcelain, fail under tensile stress because their ultimate material strength is compressive.

Shear stress, as compared to compressive stress and tensile stress alone, is a stress state caused by the combined energy of at least a pair of opposing forces acting along at least one set of parallel lines of action through the material. This is also known as stress caused by faces of a material sliding relative to one another, or twisting, stresses due to torsional loading.

Therefore, all flexible attachment members contemplated as part of the inventive concept take into account all types of force vectors may be reasonably applied to the structural elements of the grabbing apparatus 100 and are crafted using materials that have as high tensile strength as possible, while still maintain relatively high compressive and shear-stress resistant strength.

Additional embodiments and optional aspects of the present invention will now be described in detail in FIGS. 2-5. Embodiments and optional aspects can be combined or used individually, and all configurations are considered as part of the inventive concept as detailed in this application. All materials, configurations, functionality, mathematical concepts, and materials science as described above can be combined and/or used individually in all the embodiments and aspects described in detail in FIGS. 2-5, and are all also considered part of the inventive concept as detailed in this application.

Figures 2, 2A:
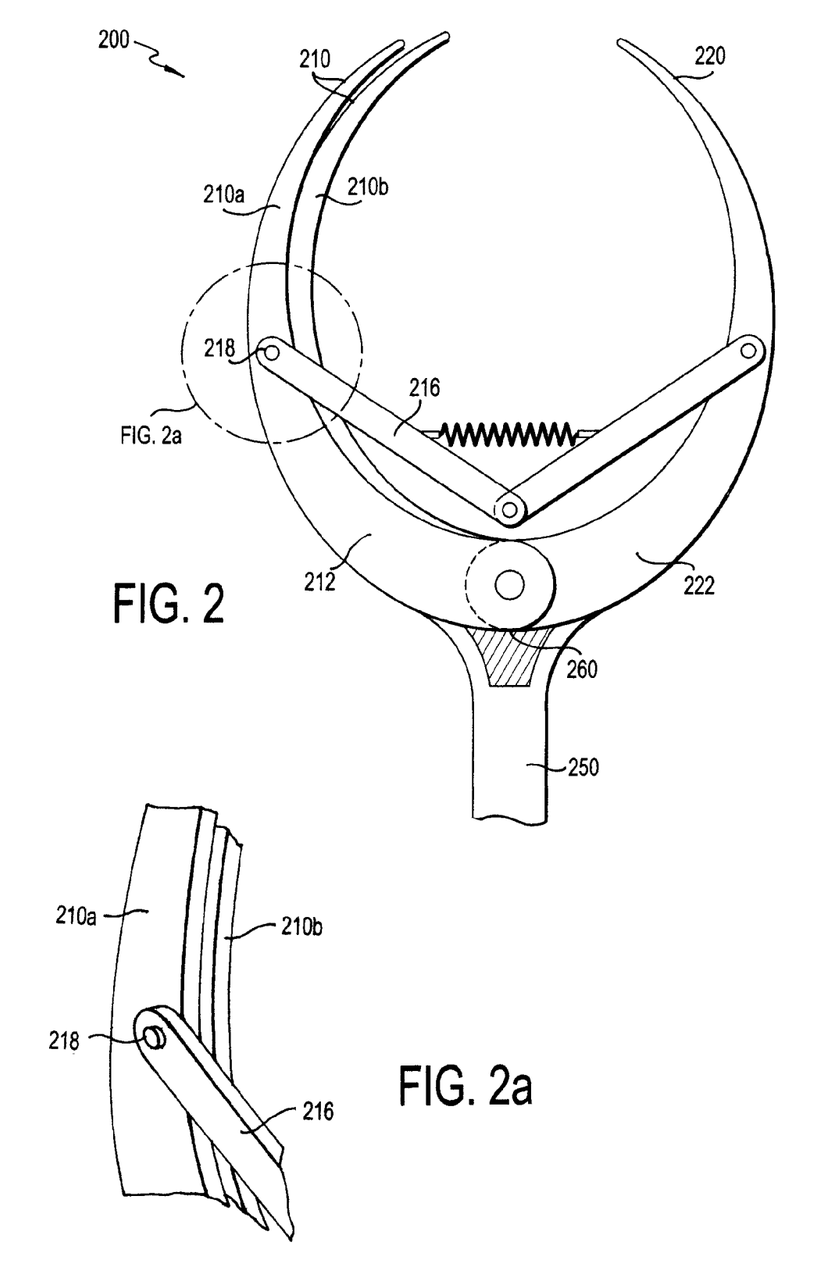
FIG. 2 illustrates an exemplary embodiment of the present invention, in which a first arm comprises a top wing and a bottom wing.
FIG. 2A illustrates a perspective view of the top wing and bottom wing also illustrated in FIG. 2.

FIG. 2 illustrates, a grabbing apparatus 200 comprising a first arm 210 which has a top wing 210a and a bottom wing 210b oriented so that the second arm 220 may sit between the top wing 210a and the bottom wing 210b. The top wing 210a and bottom wing 210b configuration illustrated in FIG. 2 may increase the stability and grasping function of the grabbing apparatus 200.

As illustrated in FIG. 2 and FIG. 2A, top wing 210a and bottom wing 210b are depicted as having at least a portion that is arced shaped. However, any other functionally compatible shapes can be provided. For example, at least a portion of the wings 210a, 210b can alternatively or additionally have a linear shape, for example, resulting in a triangular shape. It is expressly set forth that all possible shapes of the wings 210a, 210b include at least a portion having an arc or linear shape, which can form any shape, including a spiral or helical shape. Furthermore, all possible shapes can be oriented so that the second arm 220 may sit between the top wing 210a and the bottom wing 210b.

As further illustrated in FIG. 2, top wing 210a and bottom wing 210b can be oriented so that the second arm 220 may sit between the top wing 210a and the bottom wing 210b. Second arm 220 can be rotatably affixed at its second proximal end 222 to the proximal end 212 of the first arm 210, at an at least one point of affixation 260 located on the base 250, via a first fastener 218. It should be noted that the at least one point of affixation 260 is illustratively shown in FIG. 2 as being circular and passing through the proximal ends 212, 222 of the first arm 210 as well as through the second arm 220, however any structurally compatible point of affixation can be provided. For example, first point of affixation 260 can be any geometric, symmetric, asymmetric, regular or oversized shape passing through the proximal ends 212, 222 that functionally corresponds with the dimensions of the first arm 210 and second arm 220.

In the additional embodiment illustrated in FIG. 2 and FIG. 2A, first fastener 218 is illustratively shown as a rotatable screw; however any functionally compatible attachment element can be provided. For example, first fastener 218 can have one or more components that attach, or cooperatively attach, the first arm 210 to the second arm 220 and the base 250, such as one or more of a screw, a screw or bolt with an optional complementarily shaped washer and/or nut, a rivet, an enclosed ball bearing, any pivoting fastener or any other functionally compatible attachment element.

In further description, FIG. 2A depicts a side perspective of top wing 210a and bottom wing 210b. As illustrated in FIG. 2A, first anchor arm 216 is affixed to top wing 210a via a first fastener 218. However, this depiction is for illustrative purposes only. Additional configuration of affixation of first anchor arm 216 are contemplated, including but not limited to, first anchor arm 216 further comprising a top wing and a bottom wing, and being affixed to top wing 210a and bottom wing 210b via a first fastener 218 and another fastener.

Figure 3:
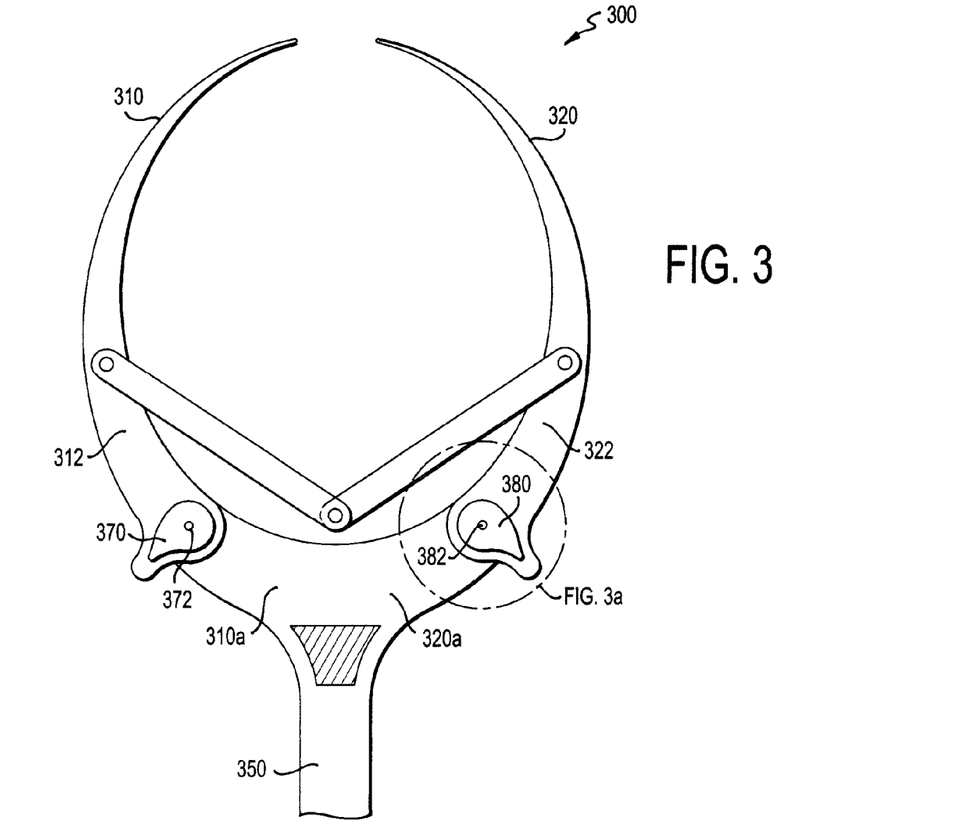
FIG. 3 illustrates an exemplary embodiment of the present invention, in which a base comprises a second and a third point of affixation for a first arm and a second arm.
Figure 3A:
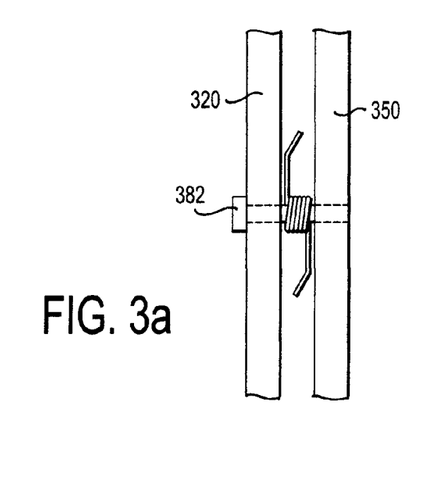
FIG. 3A illustrates a perspective view of the third point of affixation and the second arm.

FIG. 3 illustrates an exemplary embodiment containing exemplary optional aspects of grabbing apparatus 300, where a base 350 comprises a second point of affixation 370 and a third point of affixation 380 for a first arm 310 and a second arm 320. As illustrated, first and second arms 310, 320 can include respective portions 310a, 320a that are statically affixed to base 350. FIG. 3A illustrates a perspective view of the third point of affixation 380 and the second arm 320.

As illustrated in FIG. 3, at the second point of affixation 370 the first arm 310 is affixed to the base 350 via a second affixation fastener 372, and at the third point of affixation 380 the second arm 320 is affixed to the base 350 via a third affixation fastener 382.

It should be noted that the second and third point of affixation 370, 380 are illustratively shown in FIGS. 3 and 3A as being circular and passing through the proximal ends 312, 322 of the first arm 310 and the second arm 320, respectively, however any structurally compatible second and third points of affixation 370, 380 can be provided. For example, second and third points of affixation 370, 380 can be any geometric, symmetric, asymmetric, regular or oversized shape passing through the proximal ends 312, 322 that functionally corresponds with the dimensions of the first arm 310 and second arm 320.

Second and third affixation fasteners 372, 382 are illustratively shown in FIGS. 3 and 3A as torsion springs; however any functionally compatible attachment element can be provided. For example, second and third affixation fasteners 372, 382 can have one or more components that attach, or cooperatively attach to the first arm 310 and the second arm 320, such as one or more of a screw, a screw or bolt with an optional complementarily shaped washer and/or nut, a rivet, an enclosed ball bearing, any pivoting fastener or any other functionally compatible attachment element.

A variety of flexible fasteners may also be contemplated, including but not limited to, constant springs, variable springs, wave springs which can be helix-shaped, torsion springs, die springs round-wire springs, flat springs, machined springs, cantilever springs, conical springs, volute springs, hairspring or balance springs, leaf springs and any other spring or elastic-like flexible element. Use of this type of flexible fastener would remove the necessity for affixing a flexible attachment member between the first anchor arm and the second anchor arm, reducing risk of damage to additional elements due to natural forces or exposure.

Figure 4:
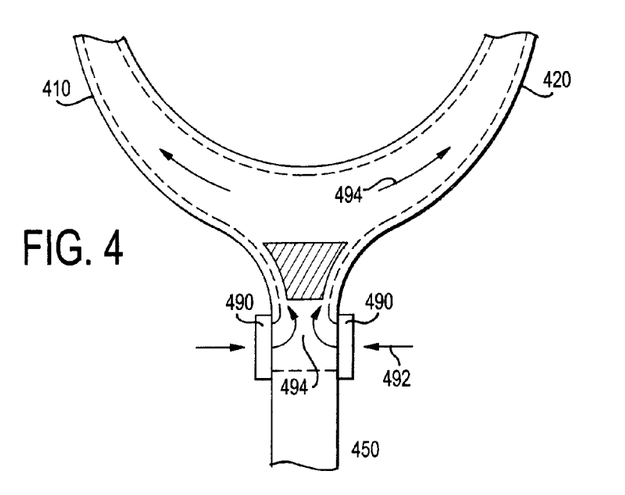
FIG. 4 illustrates an exemplary embodiment of the present invention, in which a base comprises an activating mechanism.

FIG. 4 illustrates a base 450 further comprising an activating mechanism 490 and the forces 492, 494 applied and or created when using the activating mechanism 490. Engaging the activating mechanism 490 comprises applying a compression force 492 to the activating mechanism 490 located on the base 450. Compression force 492 is a pushing force vector, or a compressive stress as described above. When the activating mechanism 490 is engaged, force vector 494 is applied to at least one of the first arm 410 and the second arm 420. Engaging the activating mechanism 490 relieves a user of the grabbing apparatus of physically creating the force vector. For example, pushing the grabbing apparatus against a docking pole or glomming the grabbing apparatus to an aeronautical parking assistant. The force vector can be created within the base 450 using a series of compressive and shear stress application methods, or any other combination of elements and forces physically necessary to create the required force vector.

FIG. 4 depicts the activating mechanism 490 being attached and/or integrated into base 450. However, a variety of configurations of activating mechanism 490 are contemplated, including but not limited to, a hand-held remote control which can be activated from a remote location, a radio or near frequency sensor which can be activated and/or pinged from a mobile device such as a phone, or any other functionally reasonable attached or detached activating mechanism 490 which can be reasonably engaged to create the force vector necessary.

Figure 5:
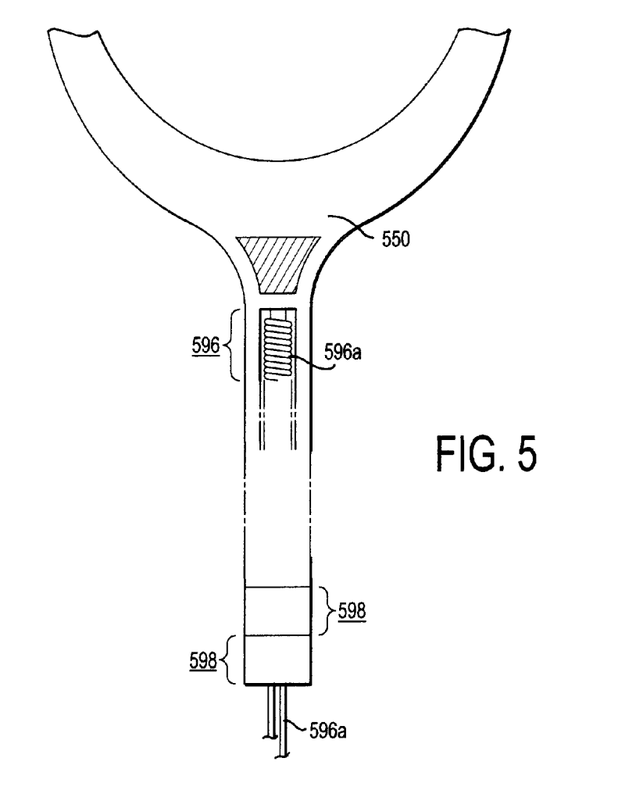
FIG. 5 illustrates an exemplary embodiment of the present invention, in which a base comprises a removable section, and a cordage element.

FIG. 5 illustrates two optional aspects of the present invention, a base 550 comprising a cordage attachment element 596 and cord 596a and a detachable handle 598. Cordage attachment element 596 further comprises a compartment and element for storing wrapped cordage 596a. The cordage 596a can be used as additional support in holding the grabbing apparatus and/or can be used to secondarily attach to a location. Further uses and/or purposes for cordage attachment element 596 and cordage 596a are contemplated.

Cordage attachment element 596, as illustrated in FIG. 5, can be embedded within base 550. However, various configurations of cordage attachment element 596 are contemplated. For example, cordage attachment element 596 can be a removable element, can clip on to the base 550, can telescope from the base 550, can be collapsible when not in use, and any other functionally compatible configuration necessary to fulfill its use and/or purpose.

The detachable handle 598 can function to extend the length of the handle as required by the user of the grabbing apparatus. Detachable handle 598 is illustrated in FIG. 5 as being a series of segments which are hollow so as to accommodate cordage 596a. However, a variety of configuration for detachable handle 598 are contemplated. For example, detachable handle 598, can have a fixed size and length, the handle can be telescoping, and the handle can be solid, requiring cordage 596a to be placed on the exterior of the handle 598, the handle can be configured so that pressure applied to the handle engages the optional activating mechanism described in FIG. 4 and/or the releasable lock as described in FIG. 1. Furthermore, any reasonably functional configuration for the detachable handle 598 is contemplated as part of the inventive concept.

Figure 6:
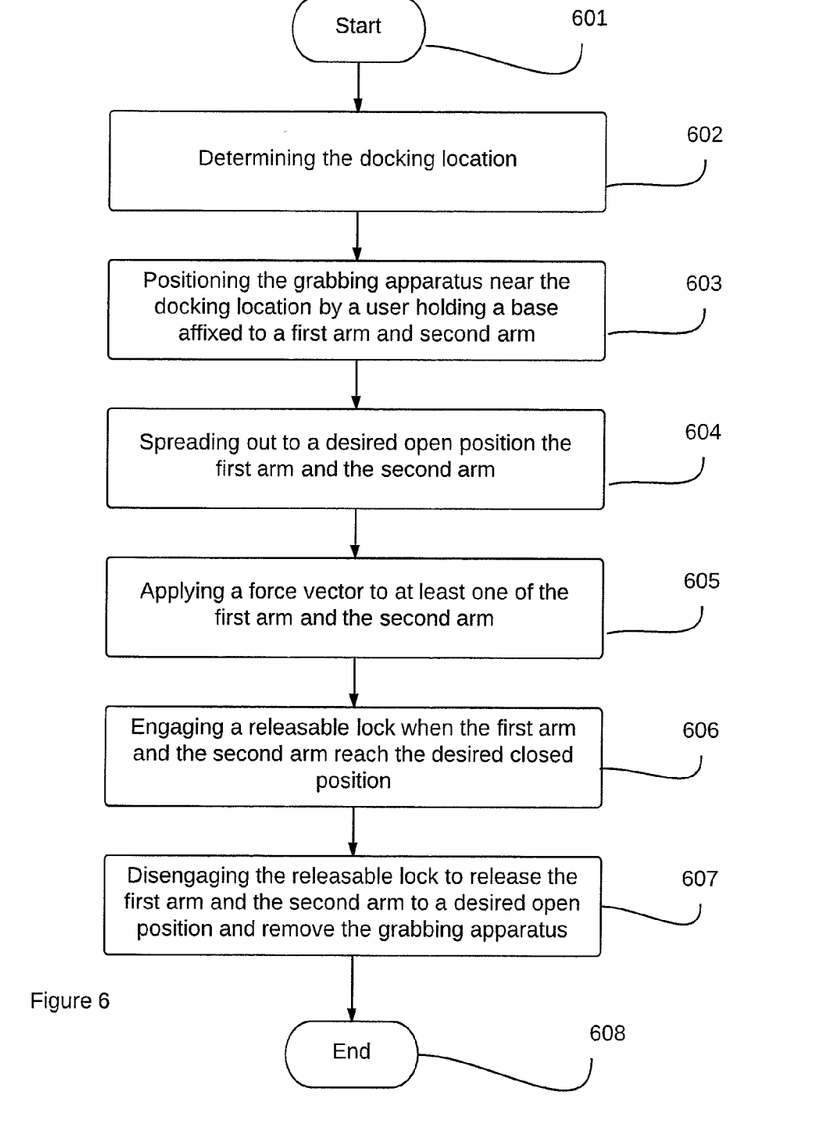
FIG. 6 illustrates a flow chart of an exemplary method of operating any one and/or all of the exemplary embodiments of the present invention described herein.

FIG. 6 illustrates one method for using a grabbing apparatus to removably connect to a docking location. An environment that this method can be used in includes, but is not limited to, a marine docking environment, for example, latching on to a dock piling, an aeronautical docking environment, for example, glomming into a hanger space, and any other docking environment in which attaching to or grasping a movable or stationary object is desired.

At 601 the method begins. At 602 the docking location is determined. Under the inventive concept, determining the docking location at 602 has been contemplated to include, but is not limited to, a person using plain or enhanced eyesight to view a dock and choose a specific piling, a person using a remote control to choose a hanger docking location or boat slip, an independent mechanical or electromagnetic device detecting a predetermined docking beacon, or any other reasonably functional human and/or machine-based user method to determine the docking location.

At 603, the grabbing apparatus is positioned near the docking location by a user holding a base affixed to a first arm and second arm, the first arm and the second arm arranged to face the docking location. Positioning the grabbing apparatus at 603 can include a variety of optional aspects, including but not limited to, a person standing on the bow or rear of a marine vessel with the base held in one or both hands and the arms directed towards a deck piling, a person triggering a remote-controlled apparatus which holds and positions the grabbing apparatus so that it is oriented for the first arm and second arm to engage a docking location; an independent mechanical or electromagnetic device sensing a docking location positioning the grabbing apparatus as to attach to the docking location, or any other reasonably functional human and/or machine-based user method to position the grabbing apparatus.

At 604, the first arm and second arm are spread out to a desired open position. Also at 604, a first anchor arm, a second anchor arm, and a flexible attachment member all affixed between the first arm and the second arm also are spread out to a desired open position simultaneously to the first arm and the second arm. According to the inventive concept as contemplated, the operation of spreading out to an open position can be manual, automated, human-controlled, machine-controlled, or any combination thereof. The desired open position can be determined based on any criteria as determined by the user of the grabbing apparatus.

At 605, a force vector is applied to at least one of the first arm and the second arm. The application of the force vector deforms the flexible attachment member and moves the first arm and the second arm directionally towards one another to a desired closed position at the docking location. Application of the force vector at 604 can include a variety of manual, automated, human-controlled and/or machine-controlled operations, including but not limited to, a person pushing the first arm and second arm at a dock piling until contact is made and the flexible attachment member is pushed into a deformation geometry, an activating mechanism attached or remotely connected to the base of the grabbing apparatus creating a force vector and applying the force vector to either of the first or the second arm, an RFID or NFC sensor pinging a beacon in an aircraft hangar, signaling an independent machine-based activation mechanism to apply a force vector, or any other functionally reasonable application of a force vector which will deform the flexible attachment member and move the first arm and the second arm to a desired closed position. The desired closed position can be determined based on any criteria as determined by the user of the grabbing apparatus.

At 606, a releasable lock can be engaged when the first arm and the second arm reach the desired closed position at the docking location. The operation of engaging the releasable lock can be manual, automated, human-controlled, machine-controlled, or any combination thereof. As an aspect of the inventive concept, a variety of optional aspects are contemplated, including the releasable lock being embedded into the base of the grabbing apparatus and manually engaged by a human or machine user, the releasable lock being a remote controlled attaching device which can be activated at the grabbing apparatus or from a remote location, manually electronically engaged by a human or machine user, or any other functionally reasonable engagement method which will engage the releasable lock when the first arm and the second arm reach the desired closed position.

At 607, releasable lock can be disengaged to release the first arm and the second arm to a desired open position and remove the grabbing apparatus from the desired closed position at the docking location. According to the inventive concept as contemplated, the operation of disengaging the releasable lock and releasing the first arm and the second arm to a desired open position can be manual, automated, human-controlled, machine-controlled, or any combination thereof. The desired open position can be determined based on any criteria as determined by the user of the grabbing apparatus. Disengaging the releasable lock at 607 has been contemplated to include, but is not limited to, manually pulling the grabbing apparatus from a docking location, activating a disengagement toggle attached to or remotely controlling the grabbing apparatus, any other functionally reasonable disengagement method which will disengage the releasable lock and release the first arm and the second arm reach the desired open position. At 608, the method terminates or restarts.

Additional methods, aspects and elements of the present inventive concept are contemplated in use in conjunction with individually or in any combination thereof which will create a reasonably function device to be of use as a grabbing apparatus to removably connect to a docking location. Methods of use are also contemplated using all optional aspects and embodiments as described above, individually or in combination thereof.

It will be apparent to one of ordinary skill in the art that the manner of making and using the claimed invention has been adequately disclosed in the above-written description of the exemplary embodiments and aspects. It should be understood, however, that the invention is not necessarily limited to the specific embodiments, aspects, arrangement and components shown and described above, but may be susceptible to numerous variations within the scope of the invention.

Moreover, particular exemplary features described herein in conjunction with specific embodiments and/or aspects of the present invention are to be construed as applicable to any embodiment described within, enabled thereby, or apparent wherefrom. Thus, the specification and drawings are to be regarded in a broad, illustrative, and enabling sense, rather than a restrictive one.

Further, it will be understood that the above description of the embodiments of the present invention are susceptible to various modifications, changes, and adaptations, and the same are intended to be comprehended within the meaning and range of equivalents of the appended claims.

Therefore, I claim:

1. A grabbing apparatus for being removably connected to a docking location, comprising:
   a first arm comprising a first proximal end, a first distal end, and a first anchor arm affixed at the first distal end via a first fastener;
   a second arm comprising a second proximal end, a second distal end, and a second anchor arm affixed at the second distal end via second fastener, wherein the second anchor arm is affixed to the first anchor arm via a third fastener;
   a flexible attachment member deformably affixed to the first anchor arm and deformably affixed to the second anchor arm via at least a deformable fastener;
   a base comprising a releasable lock and an at least one point of affixation for the first arm and the second arm, wherein the first arm is affixed to the base at said first proximal end and the second arm is affixed to the base at said second proximal end via at least one of a fourth fastener;
   wherein a force vector applied to at least one of the first arm and the second arm deforms the flexible attachment member, moving the first arm and the second arm directionally towards one another and engages the releasable lock, to removably connect the grabbing apparatus to the docking location, and the first arm and the second arm are statically affixed to the base at the at least one point of affixation.

2. A grabbing apparatus for being removably connected to a docking location, comprising:
   a first arm comprising a first proximal end, a first distal end, and a first anchor arm affixed at the first distal end via a first fastener;
   a second arm comprising a second proximal end, a second distal end, and a second anchor arm affixed at the second distal end via second fastener, wherein the second anchor arm is affixed to the first anchor arm via a third fastener;
   a flexible attachment member deformably affixed to the first anchor arm and deformably affixed to the second anchor arm via at least a deformable fastener;
   a base comprising a releasable lock and an at least one point of affixation for the first arm and the second arm, wherein the first arm is affixed to the base at said first proximal end and the second arm is affixed to the base at said second proximal end via at least one of a fourth fastener;
   wherein a force vector applied to at least one of the first arm and the second arm deforms the flexible attachment member, moving the first arm and the second arm directionally towards one another and engages the releasable lock, to removably connect the grabbing apparatus to the docking location, and the base further comprises a cordage element, wherein when at least one of the first arm and the second arm are set into an immobile position, the cordage element unravels from the base.

3. A grabbing apparatus for being removably connected to a docking location, comprising:
- a first arm comprising a first proximal end, a first distal end, and a first anchor arm affixed at the first distal end via a first fastener;
- a second arm comprising a second proximal end, a second distal end, and a second anchor arm affixed at the second distal end via second fastener, wherein the second anchor arm is affixed to the first anchor arm via a third fastener;
- a flexible attachment member deformably affixed to the first anchor arm and deformably affixed to the second anchor arm via at least a deformable fastener;
- a base comprising a releasable lock and an at least one point of affixation for the first arm and the second arm, wherein the first arm is affixed to the base at said first proximal end and the second arm is affixed to the base at said second proximal end via at least one of a fourth fastener;
- wherein a force vector applied to at least one of the first arm and the second arm deforms the flexible attachment member, moving the first arm and the second arm directionally towards one another and engages the releasable lock, to removably connect the grabbing apparatus to the docking location, and the base further comprises at least a second flexible attachment member and wherein the at least second flexible attachment member affixes the first arm to the base.

4. A grabbing apparatus for being removably connected to a docking location, comprising:
- a first arm comprising a first proximal end, a first distal end, and a first anchor arm affixed at the first distal end via a first fastener;
- a second arm comprising a second proximal end, a second distal end, and a second anchor arm affixed at the second distal end via second fastener, wherein the second anchor arm is affixed to the first anchor arm via a third fastener;
- a flexible attachment member deformably affixed to the first anchor arm and deformably affixed to the second anchor arm via at least a deformable fastener;
- a base comprising a releasable lock and an at least one point of affixation for the first arm and the second arm, wherein the first arm is affixed to the base at said first proximal end and the second arm is affixed to the base at said second proximal end via at least one of a fourth fastener;
- wherein a force vector applied to at least one of the first arm and the second arm deforms the flexible attachment member, moving the first arm and the second arm directionally towards one another and engages the releasable lock, to removably connect the grabbing apparatus to the docking location, and the base further comprises at least a third flexible attachment member and wherein the at least third flexible attachment member affixes the second arm to the base.

5. A grabbing apparatus for being removably connected to a docking location, comprising:
- a first arm comprising a first proximal end, a first distal end, and a first anchor arm affixed at the first distal end via a first fastener;
- a second arm comprising a second proximal end, a second distal end, and a second anchor arm affixed at the second distal end via second fastener, wherein the second anchor arm is affixed to the first anchor arm via a third fastener;
- a flexible attachment member deformably affixed to the first anchor arm and deformably affixed to the second anchor arm via at least a deformable fastener;
- a base comprising a releasable lock and an at least one point of affixation for the first arm and the second arm, wherein the first arm is affixed to the base at said first proximal end and the second arm is affixed to the base at said second proximal end via at least one of a fourth fastener;
- wherein a force vector applied to at least one of the first arm and the second arm deforms the flexible attachment member, moving the first arm and the second arm directionally towards one another and engages the releasable lock, to removably connect the grabbing apparatus to the docking location, and the releasable lock further comprises a second releasable lock which stops the movement of at least one of the first arm and the second arm.

* * * * *